(12) United States Patent
Lee

(10) Patent No.: US 11,148,709 B2
(45) Date of Patent: Oct. 19, 2021

(54) ELECTRIC POWER STEERING APPARATUS

(71) Applicant: MANDO CORPORATION, Gyeonggi-do (KR)

(72) Inventor: Jong Baek Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 298 days.

(21) Appl. No.: 16/052,598

(22) Filed: Aug. 1, 2018

(65) Prior Publication Data

US 2019/0047612 A1    Feb. 14, 2019

(30) Foreign Application Priority Data

Aug. 8, 2017 (KR) .......................... 10-2017-0100069

(51) Int. Cl.
*B62D 5/04* (2006.01)
*F16H 55/36* (2006.01)
(Continued)

(52) U.S. Cl.
CPC ......... *B62D 5/0448* (2013.01); *B62D 5/0424* (2013.01); *F16H 25/24* (2013.01);
(Continued)

(58) Field of Classification Search
CPC ........ B62M 9/105; F16H 55/02; F16H 55/30; F16H 7/20; F16H 2007/0865;
(Continued)

(56) References Cited

U.S. PATENT DOCUMENTS 4,402,678 A * 9/1983 St. John ................. B23P 11/00
                                                474/171
5,642,797 A * 7/1997 Wall ....................... F16D 27/112
                                                192/84.961
(Continued)

FOREIGN PATENT DOCUMENTS

CN        103711874      4/2014
CN        104179938     12/2014
(Continued)

OTHER PUBLICATIONS

Office Action dated Sep. 28, 2018 for Korean Patent Application No. 10-2017-0100069 and its English machine translation by Google Translate.
(Continued)

*Primary Examiner* — Minnah L Seoh
*Assistant Examiner* — Maurice L Williams
(74) *Attorney, Agent, or Firm* — Ladas & Parry, LLP

(57) ABSTRACT

An electric power steering apparatus includes: a ball nut, which is coupled to a rack bar therein, slides the rack bar, and has a first coupling portion formed to protrude in radial directions from one side of an external circumferential surface such that a fastening member is coupled to the first coupling portion; a nut pulley having a second coupling portion, which is formed to protrude in radial directions from an internal circumferential surface having a hollow therein and which comes in contact with the first coupling portion and to which the fastening member is coupled, and having an external circumferential surface to which the belt is connected and rotates the ball nut; and a deformation preventing member coupled to an opposite end of a portion of the nut pulley in which the second coupling portion is formed.

14 Claims, 13 Drawing Sheets

(51) Int. Cl.
*F16H 55/17* (2006.01)
*F16H 25/24* (2006.01)
*F16H 55/48* (2006.01)
*F16H 25/20* (2006.01)
*F16H 25/22* (2006.01)

(52) U.S. Cl.
CPC ........... *F16H 55/171* (2013.01); *F16H 55/36* (2013.01); *F16H 55/48* (2013.01); *F16H 25/2204* (2013.01); *F16H 2025/2096* (2013.01); *F16H 2025/249* (2013.01)

(58) Field of Classification Search
CPC .................. F16H 25/2204; F16H 25/24; F16H 2025/2096; F16H 2025/249; F16H 55/36; F16H 55/48; F16H 55/171; F16H 2055/266; F16C 2361/63; B62D 5/0424; B62D 5/0442; B62D 5/0445; B62D 5/0448
USPC .................................................. 474/152, 166
See application file for complete search history.

(56) References Cited

U.S. PATENT DOCUMENTS

| | | | | |
|---|---|---|---|---|
| 6,810,559 | B2 * | 11/2004 | Mertes | A47L 9/0477 15/179 |
| 8,016,685 | B2 * | 9/2011 | Kurosu | F16D 7/046 464/38 |
| 8,307,940 | B2 * | 11/2012 | Bugosh | B62D 5/0448 180/444 |
| 8,479,605 | B2 * | 7/2013 | Shavrnoch | B62D 5/0448 74/388 PS |
| 9,004,222 | B2 * | 4/2015 | Kaneko | B62D 5/0448 180/444 |
| 9,188,173 | B2 * | 11/2015 | Chambonneau | F16D 41/064 |
| 9,199,663 | B2 * | 12/2015 | Jung | B62D 5/0472 |
| 9,261,179 | B2 * | 2/2016 | Jiang | F16H 25/2418 |
| 9,440,672 | B2 * | 9/2016 | Holm | F16C 35/063 |
| 9,845,860 | B2 * | 12/2017 | Lannutti | F16C 35/067 |
| 9,958,050 | B2 * | 5/2018 | Kolloch | F16H 55/171 |
| 9,963,165 | B2 * | 5/2018 | Lam | B62D 5/0463 |
| 10,119,600 | B2 * | 11/2018 | Urban | B21K 1/26 |
| 10,359,084 | B2 * | 7/2019 | Hauck | F16D 41/066 |
| 10,392,048 | B2 * | 8/2019 | Sasaki | B62D 3/126 |
| 2004/0007417 | A1 * | 1/2004 | Lynn | F16H 25/24 180/444 |
| 2006/0178241 | A1 * | 8/2006 | Nosaka | F16H 57/04 474/166 |
| 2014/0260728 | A1 * | 9/2014 | Holm | F16C 35/063 74/89.23 |
| 2014/0353070 | A1 | 12/2014 | Tsukagoshi | |
| 2014/0357439 | A1 * | 12/2014 | Schaefer | F16H 55/48 474/168 |

FOREIGN PATENT DOCUMENTS

| | | | |
|---|---|---|---|
| CN | 105307922 | 2/2016 | |
| CN | 105339236 | 2/2016 | |
| CN | 105984487 | 10/2016 | |
| JP | 5584187 B2 * | 9/2014 | |
| JP | 5757467 B2 * | 7/2015 | |
| JP | 2016-97842 | 5/2016 | |
| KR | 10-2014-0047857 | 4/2014 | |
| WO | WO-2015071057 A1 * | 5/2015 | ........... B62D 5/0448 |

OTHER PUBLICATIONS

Office Action dated Oct. 28, 2020 for Chinese Patent Application No. 201810890527.4 and its English translation from Global Dossier.
Office Action dated Jul. 12, 2021 for Chinese Patent Application No. 201810890527.4 and its English translation from Global Dossier.

* cited by examiner

ELECTRIC POWER STEERING APPARATUS

CROSS REFERENCE TO RELATED APPLICATION

This application claims priority to Korean Patent Application No. 10-2017-0100069, filed on Aug. 8, 2017, which is hereby incorporated by reference for all purposes as if fully set forth herein.

TECHNICAL FIELD

The present disclosure relates to an electric power steering apparatus and more particularly, to an electric power steering apparatus for preventing a nut pulley from being instantly dented by belt tension in a steering operation and preventing tooth jumping between the nut pulley and a belt by enhancing rigidity of the nut pulley while remarkably reducing a weight of the nut pulley and reducing noise caused by friction against the belt.

BACKGROUND

In general, existing electric power steering apparatuses include, as components, a ball nut connected to a motor with a belt, a motor pulley, a nut pulley, a rack bar slided by rotation of the ball nut, etc. which transfer a driving force of the motor to the rack bar and generate an assist steering force to assist with a driver's steering force.

However, in this existing electric power steering apparatus, the ball nut and a nut pulley are coupled together through fitting, and the ball nut slips in the nut pulley. Therefore, efficiency in power transmission is degraded, and an accurate assist steering force is not transmitted.

Also, since the nut pulley is formed of a plastic material to remarkably reduce a weight thereof, the nut pulley is instantly dented by belt tension in a steering operation, and tooth jumping occurs between the nut pulley and the belt.

SUMMARY

Various embodiment of the present disclosure may provide an electric power steering apparatus in which coupling force between a ball nut and a nut pulley is increased in comparison with a ball nut and a nut pulley coupled together through fitting according to a related art, wherein a change in an assist steering force or a non-steerable situation during high-speed travel due to a slipping nut pulley are prevented from occurring and thus a driver is provided with a stable steering condition.

In some embodiments of the present disclosure, an electric power steering apparatus may prevent a nut pulley from being instantly dented by belt tension in a steering operation and preventing tooth jumping between the nut pulley and a belt by enhancing rigidity of the nut pulley while remarkably reducing a weight of the nut pulley and noise caused by friction against the belt.

In certain embodiments of the present disclosure, a deformation preventing member and nut pulley of an electric power steering apparatus may be easily manufactured by injection molding and the deformation preventing member of the electric power steering apparatus may be provided inside the nut pulley so that a size of the nut pulley may be manufactured accurately.

Objects of the present disclosure are not limited thereto, and other objects which have not been mentioned will be apparent to those of ordinary skill in the art from the following descriptions.

Some embodiments of the present disclosure may provide an electric power steering apparatus including: a ball nut configured to be coupled to a rack bar therein, slide the rack bar, and have a first coupling portion formed to protrude in radial directions from one side of an external circumferential surface such that a fastening member is coupled to the first coupling portion; a nut pulley configured to have a second coupling portion, which is formed to protrude in radial directions from an internal circumferential surface having a hollow therein and which comes in contact with the first coupling portion and to which the fastening member is coupled, and to have an external circumferential surface to which the belt is connected and rotates the ball nut; and a deformation preventing member configured to be coupled to an opposite end of a portion of the nut pulley in which the second coupling portion is formed.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
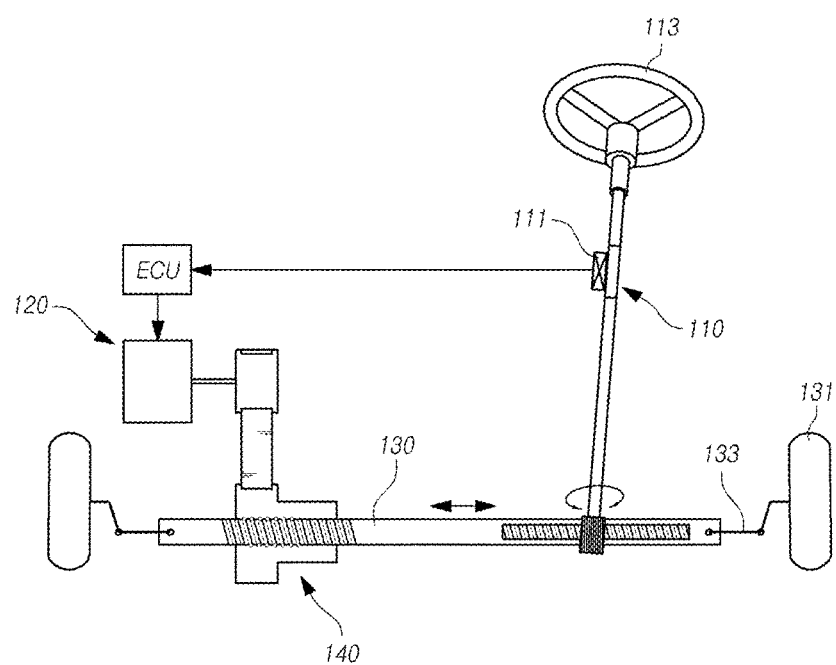
FIG. 1 is a diagram schematically showing an electric power steering apparatus according to an embodiment of the present disclosure.

Hereinafter, embodiments of the present disclosure will be described in detail with reference to the accompanying drawings. In adding reference numerals to elements in each drawing, the same elements will be designated by the same reference numerals if possible, although they may be shown in different drawings. Further, in the following description of the present disclosure, a detailed description of known functions and configurations incorporated herein will be omitted when it is determined that the description may make the subject matter of the present disclosure rather unclear.

In describing elements of embodiments of the present disclosure, terms such as "first," "second," "A," "B," "(a)," and "(b)" may be used. Such terms are used only to distinguish an element from another element, but do not limit the substance, sequence, order, or the like of elements.

It should be noted that when one component is described as being "connected," "coupled," or "joined" to another component, still another component may be "connected," "coupled," or "joined" between the two components, even though the component may be directly "connected," "coupled," or "joined" to the other component.

Figure 2:
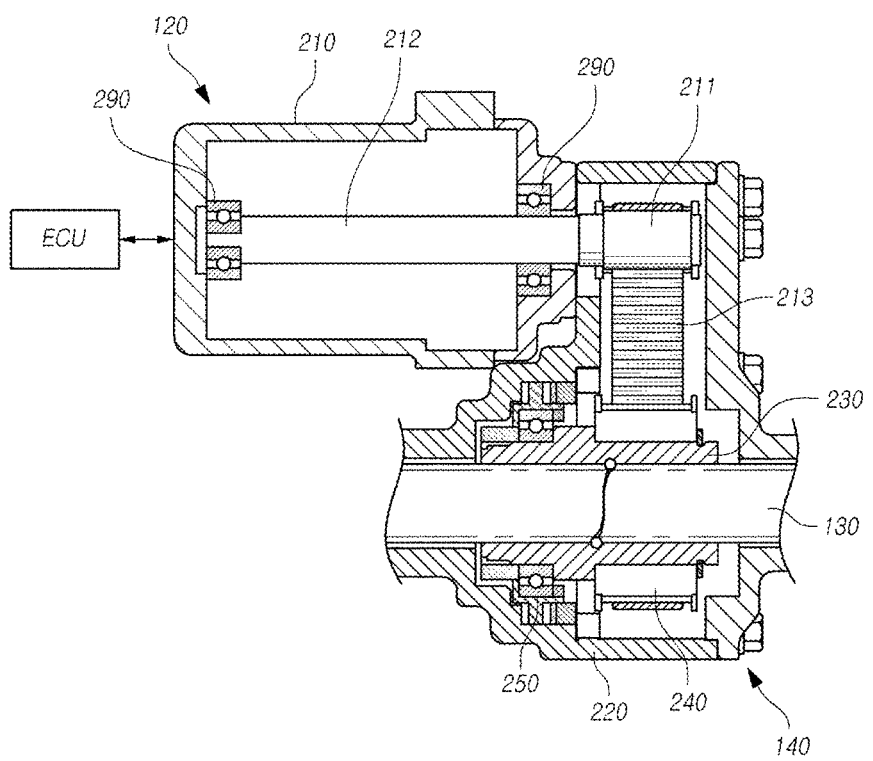
FIG. 2 is a partial cross-sectional view schematically showing a part of an electric power steering apparatus according to an embodiment of the present disclosure.
Figure 3:
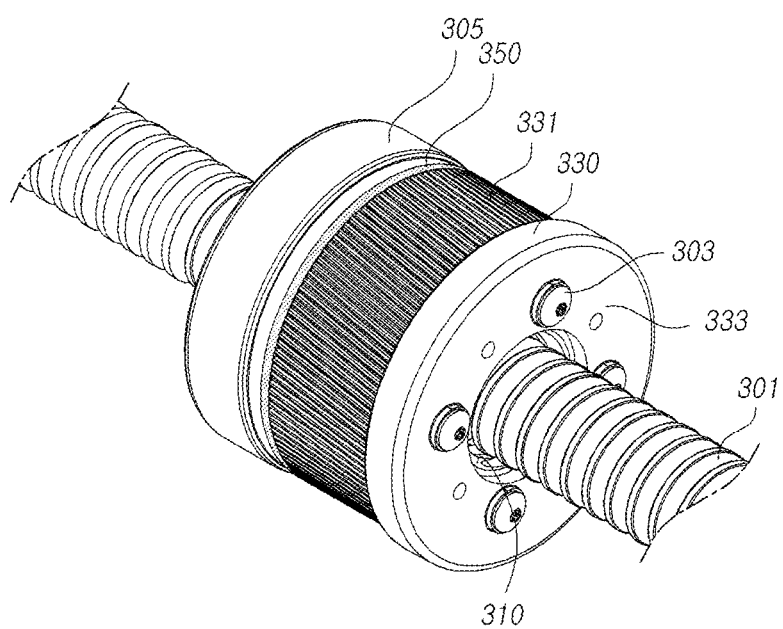
FIG. 3 is a perspective view showing a part of an electric power steering apparatus according to an embodiment of the present disclosure.
Figure 4:
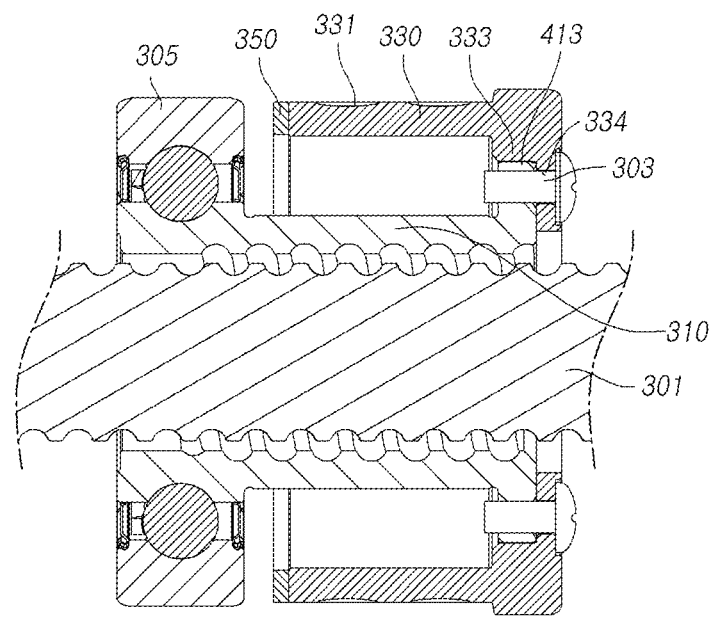
FIG. 4 is a cross-sectional view of FIG. 3.
Figure 5:
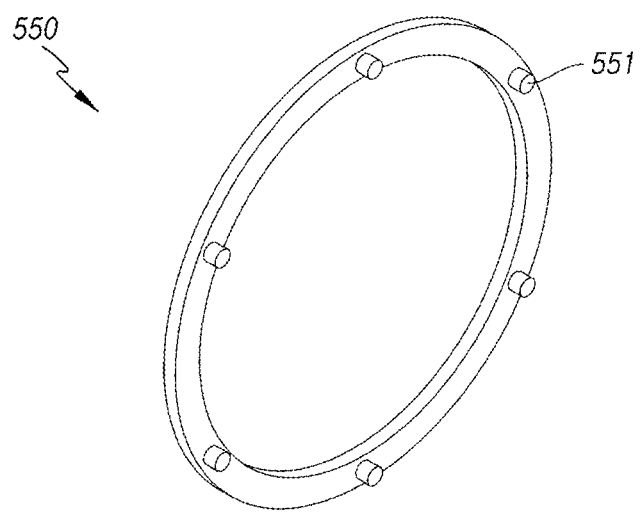
FIGS. 5 and 6 are perspective views showing a part of an electric power steering apparatus according to embodiments of the present disclosure.
Figure 6:
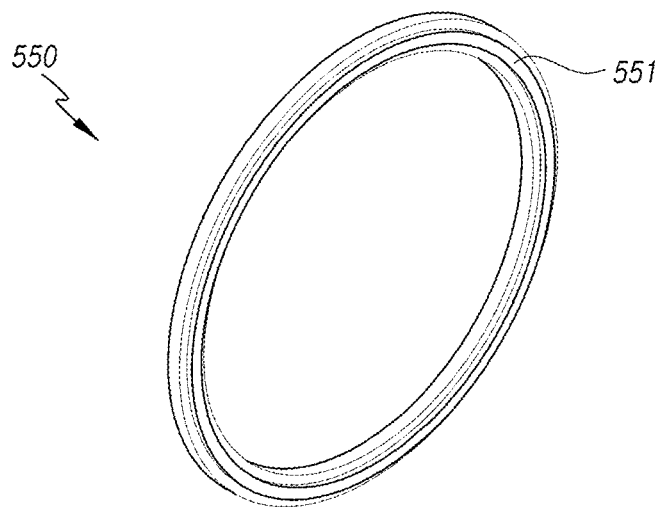
Figure 7:
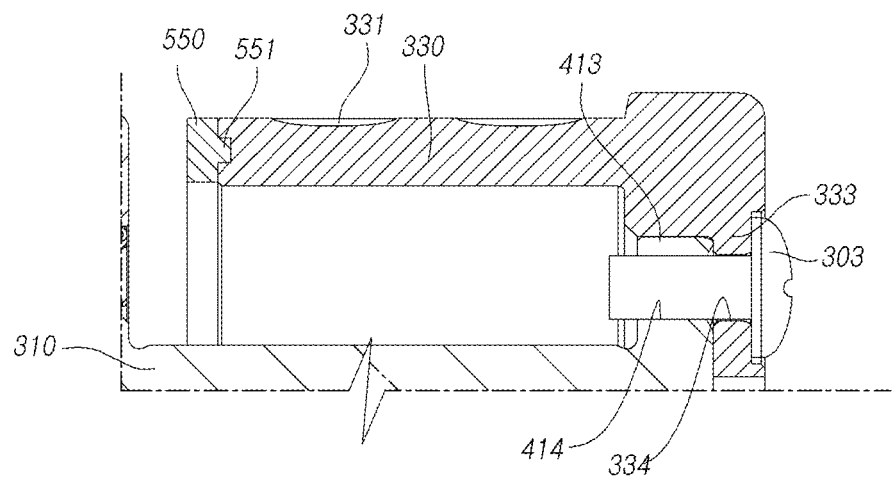
FIGS. 7 and 8 are cross-sectional views showing a part of an electric power steering apparatus according to embodiments of the present disclosure.
Figure 8:
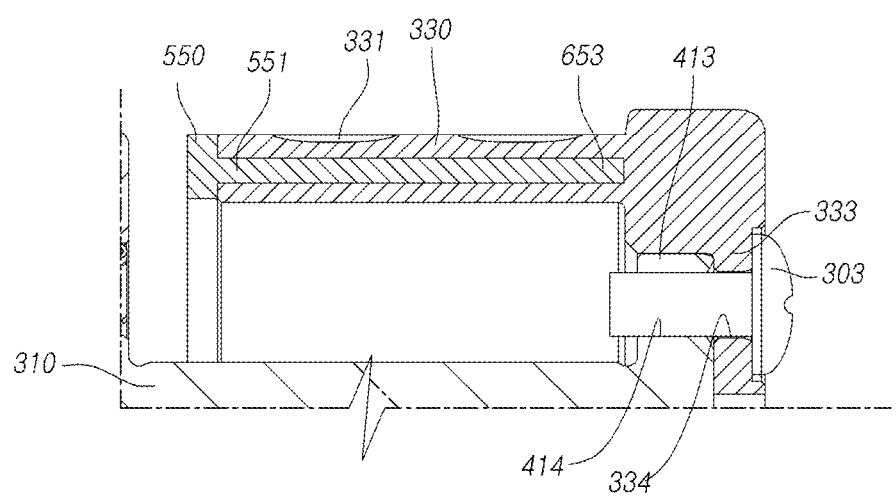
Figure 9:
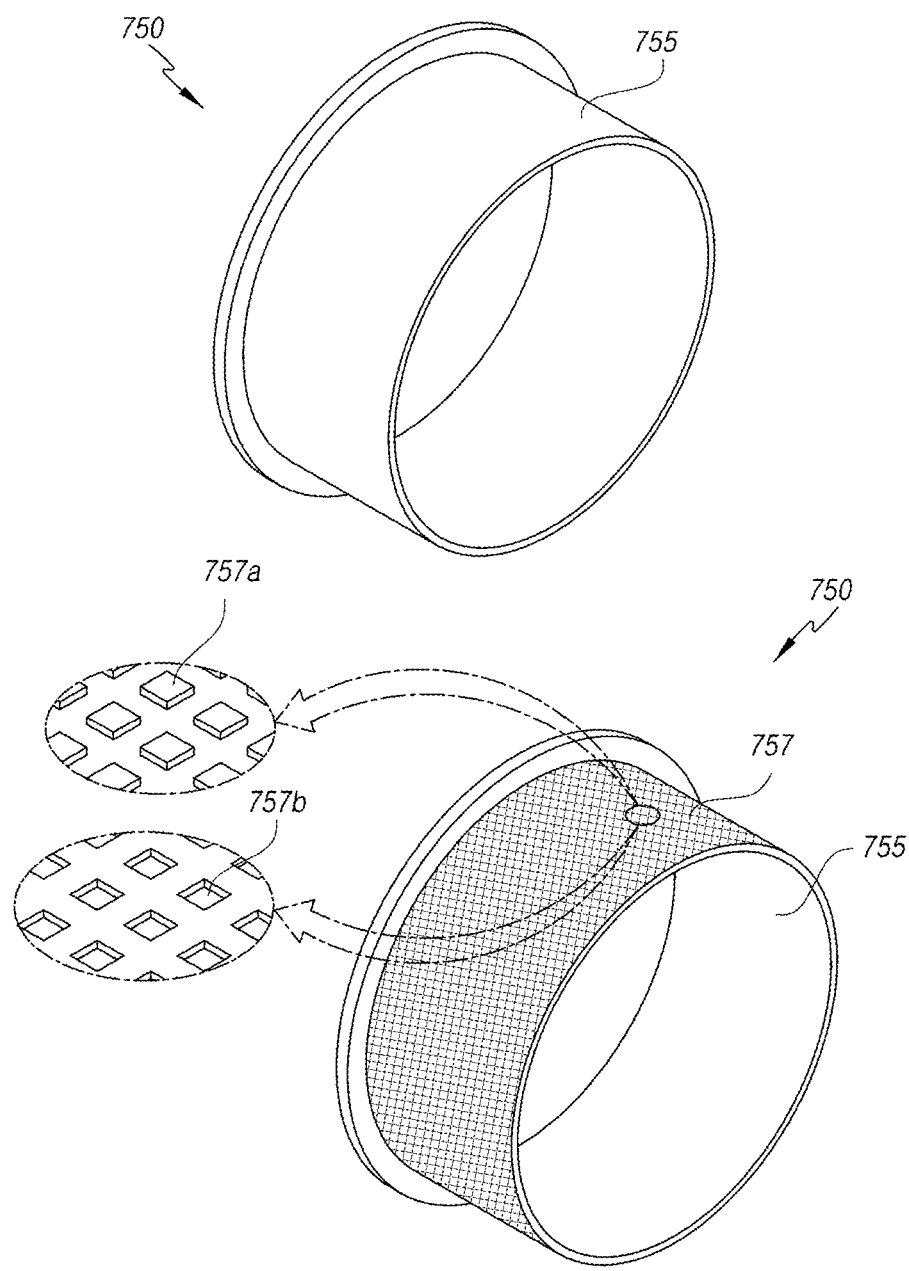
FIG. 9 shows perspective views of a part of an electric power steering apparatus according to an embodiment of the present disclosure.
Figure 10:
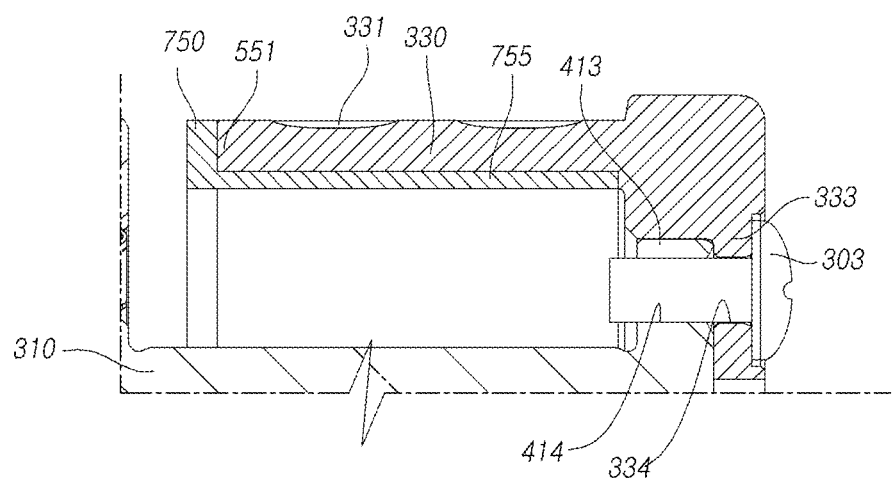
FIGS. 10 and 11 are cross-sectional views showing a part of an electric power steering apparatus according to embodiments of the present disclosure.
Figure 11:
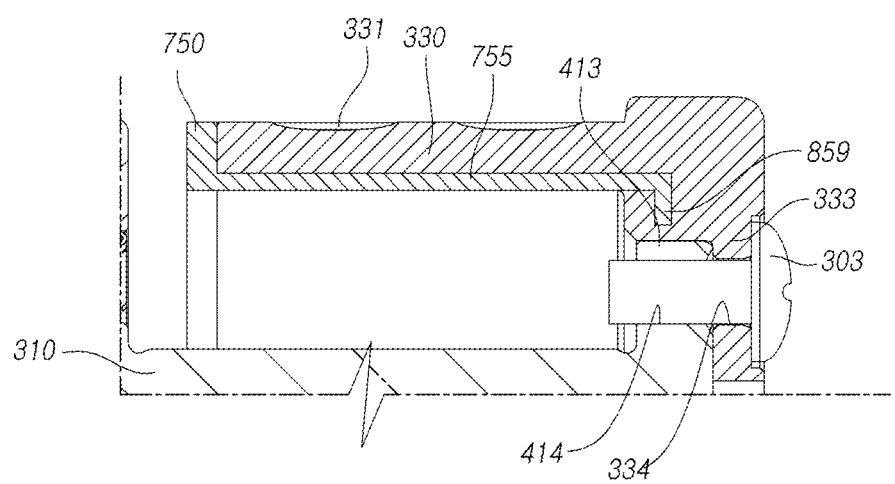
Figure 12:
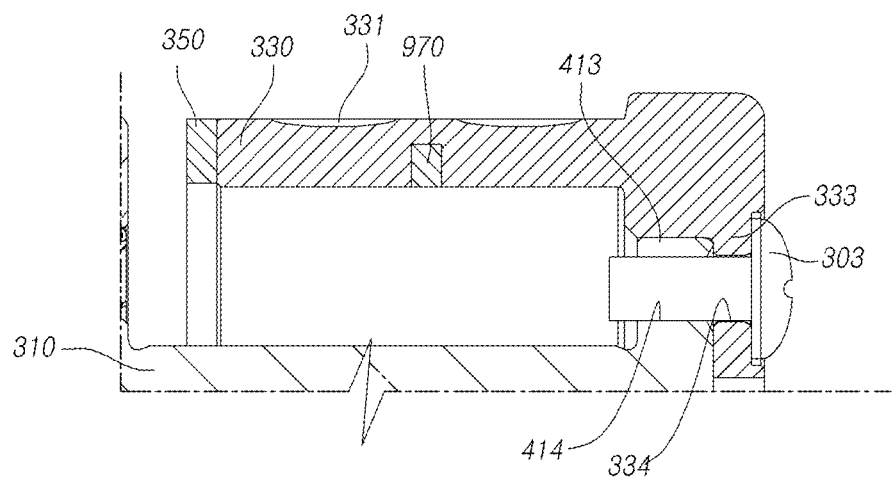
FIGS. 12 and 13 are cross-sectional views showing a part of an electric power steering apparatus according to embodiments of the present disclosure.
Figure 13:
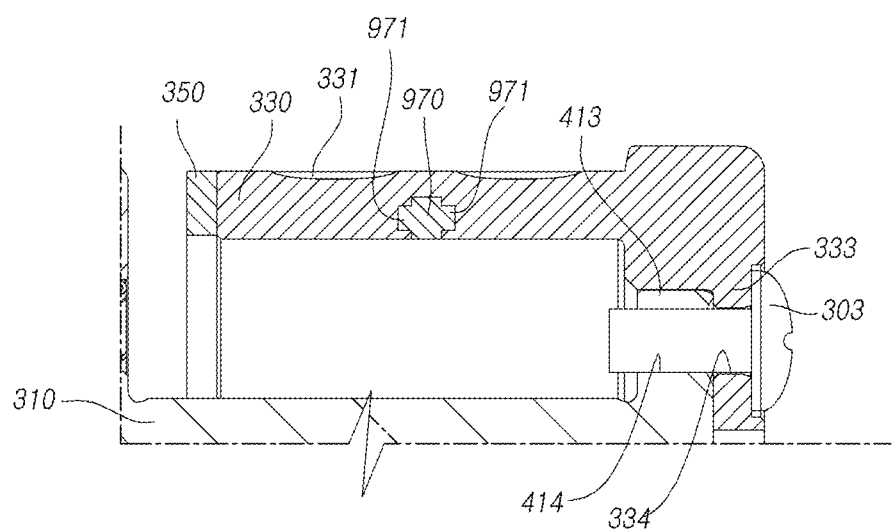

FIG. 1 is a diagram schematically showing an electric power steering apparatus according to an embodiment of the present disclosure, FIG. 2 is a partial cross-sectional view schematically showing a part of an electric power steering apparatus according to an embodiment of the present disclosure, FIG. 3 is a perspective view showing a part of an electric power steering apparatus according to an embodiment of the present disclosure, FIG. 4 is a cross-sectional view of FIG. 3, FIGS. 5 and 6 are perspective views showing a part of an electric power steering apparatus according to embodiments of the present disclosure, FIGS. 7 and 8 are cross-sectional views showing a part of an electric power steering apparatus according to embodiments of the present disclosure, FIG. 9 shows perspective views of a part of an electric power steering apparatus according to an embodiment of the present disclosure, FIGS. 10 and 11 are cross-sectional views showing a part of an electric power steering apparatus according to embodiments of the present disclosure, and FIGS. 12 and 13 are cross-sectional views showing a part of an electric power steering apparatus according to embodiments of the present disclosure.

Referring to FIGS. 1 and 2 first, an electric power steering apparatus according to an embodiment of the present disclosure includes a driving means 120 controlled by an electronic control unit (ECU), which determines the degree of steering of a steering wheel 113 through a torque sensor 111 installed on a steering column 110 so that power is generated, a rack bar 130 which moves tie rods 133 connected to wheels 131 according to the degree of steering, and a means 140 of being driven which receives and converts a turning force of the driving means 120 into an axial-direction movement force and transfers the axial-direction movement force to the rack bar 130.

As shown in FIG. 2, the driving means 120 includes an electric motor 210 controlled by the ECU, a driving pulley 211 fixed to a motor shaft 212 of the electric motor 210, and a driving belt 213 wound around the driving pulley 211.

The means 140 of being driven has a ball nut 230 supporting the rack bar 130 in a rack housing 220 surrounding the rack bar 130, and a nut pulley 240 is assembled and formed on an external circumferential surface of the ball nut 230.

The driving pulley 211 connected to the motor shaft 212 of the electric motor 210 and the nut pulley 240 coupled to the ball nut 230 are disposed in parallel to each other. The driving belt 213 is fitted on the driving pulley 211 and the nut pulley 240 to transmit the turning force of the electric motor 210 to the rack bar 130, and the rack bar 130 is moved to the left or right by operation of the ball nut 230 so that an assist force is generated.

An internal circumferential spiral groove is formed to have a semicircular cross-section on an internal circumferential surface of the ball nut 230, and an external circumferential groove is formed to have a semicircular cross-section on an external circumferential surface of the rack bar 130. Balls are inserted between the internal circumferential spiral groove and the external circumferential spiral groove.

The nut pulley 240 is fitted into and coupled to one side of the ball nut 230, and a ball bearing 250 is coupled to the other side and supports the ball nut 230.

The motor shaft 212 is rotatably coupled to the electric motor 210 through bearings 290, and the driving pulley 211 is fitted into and coupled to an end of the motor shaft 212.

Such an embodiment of the present disclosure will be described in further detail with reference to FIGS. 3 to 9. The electric power steering apparatus according to an embodiment of the present disclosure includes: a ball nut 310, which is coupled to a rack bar 301 therein, slides the rack bar 301, and has a first coupling portion 413 which is formed to protrude in radial directions from one side of an external circumferential surface such that a fastening member 303 is coupled to the first coupling portion 413; a nut pulley 330 having a second coupling portion 333, which is formed to protrude in radial directions from an internal circumferential surface having a hollow therein and which comes in contact with the first coupling portion 413 and to which the fastening member 303 is coupled, and having an external circumferential surface to which the belt 213 is connected and rotates the ball nut 310; and a ring-shaped deformation preventing member 350 coupled to an opposite end of a portion of the nut pulley 330 in which the second coupling portion 333 is formed.

In the electric power steering apparatus, the nut pulley 330 is coupled to the ball nut 310 which slides the rack bar 301 to the left or right. Therefore, when the motor 210 (see FIG. 2) is driven by the ECU, the belt 213 transmits turning force and rotates the ball nut 310. Then, the rack bar 301 slides to the left or right and assists steering force of a driver.

The ball nut 310 is coupled to the rack bar 301 therein and slides the rack bar 301, and the first coupling portion 413 protruding in radial directions is formed on one side of an external circumferential surface of the ball nut 310.

In the first coupling portion 413, a first coupling hole 414, to which the fastening member 303 is coupled, is formed, and the fastening member 303 is threadedly engaged with the first coupling hole 414.

A bearing 305 is coupled to an external circumferential surface of the ball nut 310 and is coupled to the inside of the rack housing 220 (see FIG. 2) so that the ball nut 310 may be rotatably supported in the rack housing 220.

Here, the bearing 305 is fitted into and coupled to the ball nut 310. The bearing 305 may be positioned and fixed by a raise (not shown) or a locknut (not shown) formed on the ball nut 310, or an inner ring of the bearing 305 may be integrally formed with the ball nut 310 as shown in the drawings.

The nut pulley 330 is coupled to the external circumferential surface of the ball nut 310 and rotates the ball nut 310 when the belt 213 is operated.

The nut pulley 330 is formed as a hollow shape. The second coupling portion 333 is formed to protrude in radial directions from one side of the internal circumferential surface of the nut pulley 330 and come in contact with the first coupling portion 413, and a second coupling hole 334, to which the fastening member 303 is coupled, is formed.

The first coupling hole 414 and the second coupling hole 334 are formed at positions of the ball nut 310 and the nut pulley 330 corresponding to each other in a circumferential direction. As an example, the drawings show that the first coupling hole 414 and the second coupling hole 334 are formed at four positions and the fastening member 303 is coupled to each of the positions, but two or more of each of the first coupling hole 414, the second coupling hole 334, and the fastening member 303 are provided in the circumferential direction.

When the fastening member 303 is fastened to the first coupling hole 414 through the second coupling hole 334, the nut pulley 330 is coupled to the ball nut 310. As a result, coupling force between the ball nut 310 and the nut pulley 330 is remarkably increased, and the ball nut 310 is prevented from slipping in the nut pulley 330. Therefore, it is possible to prevent a change in an assist steering force and prevent a non-steerable situation during high-speed traveling.

The belt 213 is connected to the external circumferential surface of the nut pulley 330 and rotates the ball nut 310. As an example, a pulley gear 331 may be formed on the external circumferential surface of the nut pulley 330 and engaged with the belt 213 to rotate, and when the belt 213 is operated, belt tension is applied through the pulley gear 331 of the nut pulley 330.

The nut pulley 330 has a certain rigidity in order to rotate along with operation of the belt 213 and may be formed of a plastic material to reduce weight and noise caused by engagement with the belt 213. The deformation preventing member 350 is provided to prevent the opposite end of the nut pulley 330 from being dented.

The deformation preventing member 350 is formed in a ring shape and provided at the opposite end of the portion of the nut pulley 330 in which the second coupling portion 333 is formed, and the deformation preventing member 350 prevents the opposite end of the nut pulley 330 from being dent.

When the belt 213 operates, a load of belt tension is applied to belt 213 and the nut pulley 330. Since the nut pulley 330 is formed of a plastic material, the nut pulley 330 is instantly distorted and dented. In particular, the deformation preventing member 350 is provided to prevent deformation of the opposite end of the portion of the nut pulley 330 coupled to the ball nut 310.

The deformation preventing member 350 may be formed of a steel material or the like having high strength. As an example, the nut pulley 330 may be formed by injection molding and coupled to the deformation preventing member 350.

Since the deformation preventing member 350 is integrally formed with the opposite end of the nut pulley 330 by injection molding, the deformation preventing member 350 supports and thus maintains the shape of the opposite end of the nut pulley 330 when the opposite end of the nut pulley 330 may be deformed.

One end of the nut pulley 330 is coupled to the first coupling portion 413 of the ball nut 310 so that a shape thereof may be maintained. The opposite end is integrally formed with the deformation preventing member 350 so that a shape thereof may be maintained. As a result, it is possible to prevent the nut pulley 330 from being dented by belt tension.

One side surface of the deformation preventing member 350 may come into contact with and be coupled to a side surface of the opposite end of the nut pulley 330, or may be inserted into and coupled to the opposite end of the nut pulley 330.

The deformation preventing member 350 formed of a material having high strength supports the opposite end of the nut pulley 330 and prevents the opposite end of the nut pulley 330 from being dent even when belt tension is instantaneously applied to the nut pulley 330.

As shown in FIGS. 5 to 8, a protrusion 551 is formed to protrude in an axial direction from the side of the deformation preventing member 350 coupled to the nut pulley 330 in order to facilitate injection molding of a deformation preventing member 550 and the nut pulley 330.

As shown in FIG. 5, a plurality of protrusions 551 are formed to be spaced apart from each other in the circumferential direction on a side surface of the deformation preventing member 550.

In other words, the plurality of protrusions 551 are formed to protrude from the deformation preventing member 550 with a projection shape.

Since the protrusions 551 are formed by injection molding in respective holes on the side surface of the nut pulley when the deformation preventing member 550 and the nut pulley 330 are formed by injection molding, the injection molding is facilitated.

Also, as shown in FIG. 6, a protrusion 551 is formed along the circumferential direction to protrude in the axial direction from the side surface of the deformation preventing member 550.

In other words, the protrusion 551 protrudes from the deformation preventing member 550 in a ring shape so that injection molding of the protrusion 551 and the nut pulley 330 may be facilitated.

Such a protrusion 551 may protrude by a certain length to support the opposite end of the nut pulley 330, as shown in FIG. 7, or may extend to the second coupling portion 333 to enhance rigidity between the end and the opposite end of the nut pulley 330, as shown in FIG. 8.

When an extension 653 that is the protrusion 551 extending to the second coupling portion 333 is formed as shown in FIG. 8, the extension 653 is provided in the nut pulley 330 between the opposite end of the nut pulley 330 and the second coupling portion 333 to enhance rigidity and prevent deformation of the nut pulley 330.

To facilitate injection molding of the deformation preventing member 550, on which the extension 653 has been formed, and the nut pulley 330, the internal circumferential surface and the external circumferential surface of the extension 653 may be knurled.

As another example of such a deformation preventing member, a support portion 755 is formed to protrude in the axial direction from a side surface of a deformation preventing member 750 coupled to the nut pulley 330 and to support the internal circumferential surface of the nut pulley 330 as shown in FIGS. 9 to 11.

The support portion 755 prevents deformation of the nut pulley 330 by supporting the internal circumferential surface of the nut pulley 330 and is formed in a cylindrical shape as shown in FIGS. 9 and 10.

Also, as shown in FIG. 9, a plurality of uneven portions 757 which are depressed or raised are diagonally formed on an external circumferential surface of the support portion 755 so that the deformation preventing member 750 and the nut pulley 330 may be easily formed by injection molding.

The upper enlarged perspective view of FIG. 9 shows an example in which uneven portions 757a are formed to protrude on the external circumferential surface of the support portion 755, and the lower enlarged perspective view shows an example in which uneven portions 757b are formed to be depressed from the external circumferential surface of the support portion 755.

The uneven portions 757 improve coupling force between the deformation preventing member 750 and the nut pulley 330 so that the deformation preventing member 750 and the nut pulley 330 may be easily formed by injection molding.

Also, as shown in FIG. 11, a bent portion 859 is formed to protrude inward in radial directions from an extended end of the support portion 755, thereby enhancing rigidity of the second coupling portion 333.

The bent portion 859 extends to the second coupling hole 334 of the second coupling portion 333, thereby enhancing rigidity of a portion of the nut pulley 330 to which the fastening member 303 is coupled.

Also, the bent portion 859 is bent at the end of the support portion 755 and provided in the second coupling portion 333, thereby enhancing rigidity of the second coupling portion 333 and preventing deformation of the second coupling portion 333 even when belt tension is applied instantaneously.

As shown in FIGS. 12 and 13, a ring-shaped rigidity enhancing member 970 is additionally provided at a position spaced away from the deformation preventing member 350 in the axial direction.

The deformation preventing member 350 is formed by injection molding and provided together with the nut pulley 330 at a position spaced away from the rigidity enhancing member 970 in the opposite axial direction and enhances rigidity between the opposite end of the nut pulley 330 and the second coupling portion 333.

Here, as shown in FIG. 12, a diameter of an external circumferential surface of the rigidity enhancing member 970 is formed to be smaller than a diameter of the external circumferential surface of the nut pulley 330. In other words, the diameter of the external circumferential surface of the rigidity enhancing member 970 is formed to be smaller than the diameter of a valley of the pulley gear 331 so that the rigidity enhancing member 970 may not protrude from the pulley gear 331.

Also, as shown in FIG. 13, a protuberance 971 protruding in the axial direction is formed on one or both of two side surfaces of the rigidity enhancing member 970 to facilitate injection molding of the rigidity enhancing member 970 and the nut pulley 330.

FIG. 13 shows an example in which protuberances 971 are formed on the both side surfaces of the rigidity enhancing member 970.

A plurality of rigidity enhancing members 970 may be provided at positions spaced away from each other in the axial direction. With an increase in the number of rigidity enhancing members 970, rigidity of the nut pulley 330 increases.

According to embodiments of the present disclosure having such a form and structure, coupling force between a ball nut and a nut pulley is remarkably increased in comparison with a ball nut and a nut pulley coupled together through fitting according to a related art, and a change in assist steering force or a non-steerable situation during high-speed travel due to a slipping nut pulley are prevented from occurring such that a driver may be provided with a stable steering condition.

Also, it is possible to prevent a nut pulley from being instantly dented by belt tension in a steering operation and prevent tooth jumping between the nut pulley and a belt by enhancing rigidity of the nut pulley while remarkably reducing a weight of the nut pulley and noise caused by friction against the belt.

Further, since a deformation preventing member is manufactured together with a nut pulley by injection molding, it is easy to manufacture the deformation preventing member and the nut pulley. In addition, since the deformation preventing member is provided in the nut pulley, a size of the nut pulley may be manufactured accurately.

Even if all the components of the embodiments of the present disclosure have been described as being combined into a single unit or combined to be operated as a single unit, the present disclosure is not necessarily limited to the embodiments. In other words, at least two of all the structural components may be selectively combined and operated without departing from the objective scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An electric power steering apparatus comprising:
   a ball nut coupled to a rack bar and configured to slide the rack bar, the ball nut comprising a first coupling portion formed to protrude outward from an outer surface of the ball nut to be coupled with a fastening member;
   a nut pulley configured to rotate the ball nut and comprising an outer surface associated with a belt and a second coupling portion formed to protrude inward from an inner hollow surface of the nut pulley, the second coupling portion of the nut pulley affixed to the first coupling portion of the ball nut by the fastening member; and
   a deformation preventing member coupled to a portion of the nut pulley opposite to where the second coupling portion of the nut pulley is formed and configured to maintain a shape of the portion of the nut pulley, wherein the deformation preventing member is affixed to a end of the nut pulley.

2. The electric power steering apparatus of claim 1, wherein the nut pulley and the deformation preventing member are injection molded to be coupled together.

3. The electric power steering apparatus of claim 2, wherein a support portion is formed to protrude toward the second coupling portion of the nut pulley from a surface of the deformation preventing member contacted with the nut pulley and is configured to support an inner surface of the nut pulley.

4. The electric power steering apparatus of claim 3, wherein one or more uneven portions, which are depressed or raised, are formed on an outer surface of the support portion of the deformation preventing member.

5. The electric power steering apparatus of claim 4, wherein the one or more uneven portions are diagonally arranged on the outer surface of the support portion of the deformation preventing member.

6. The electric power steering apparatus of claim 3, wherein a bent portion is formed to protrude inward from an end of the support portion of the deformation preventing member.

7. The electric power steering apparatus of claim 2, further comprising one or more ring-shaped rigidity enhancing members disposed to be spaced away from the deformation preventing member.

8. The electric power steering apparatus of claim 7, wherein one or more protuberance protruding in a direction parallel to an axis of the rack bar are formed on one or both of side surfaces of the rigidity enhancing member.

9. The electric power steering apparatus of claim 1, wherein a plurality of protrusions are formed to protrude toward the nut pulley from a surface of the deformation preventing member coupled to the nut pulley and are disposed to be spaced away from each other on the surface of the deformation preventing member.

10. The electric power steering apparatus of claim 1, wherein the deformation preventing member comprises a material having a higher strength than the nut pulley.

11. An electric power steering apparatus comprising:
a ball nut coupled to a rack bar and configured to slide the rack bar, the ball nut comprising a first coupling portion formed to protrude outward from an outer surface of the ball nut to be coupled with a fastening member;
a nut pulley configured to rotate the ball nut and comprising an outer surface associated with a belt and a second coupling portion formed to protrude inward from an inner hollow surface of the nut pulley, the second coupling portion of the nut pulley affixed to the first coupling portion of the ball nut by the fastening member; and
a deformation preventing member coupled to the nut pulley and configured to maintain a shape of the portion of the nut pulley,
wherein at least one protrusion is formed to protrude toward the nut pulley from a surface of the deformation preventing member coupled to the nut pulley.

12. The electric power steering apparatus of claim 11, wherein the at least one protrusion is formed around a circumference of the deformation preventing member to protrude toward the nut pulley from the surface of the deformation preventing member coupled to the nut pulley.

13. The electric power steering apparatus of claim 11, wherein the at least one protrusion is formed to extend to the second coupling portion of the nut pulley.

14. An electric power steering apparatus comprising:
a ball nut coupled to a rack bar and configured to slide the rack bar, the ball nut comprising a first coupling portion formed to protrude outward from an outer surface of the ball nut to be coupled with a fastening member;
a nut pulley configured to rotate the ball nut and comprising an outer surface associated with a belt and a second coupling portion formed to protrude inward from an inner hollow surface of the nut pulley, the second coupling portion of the nut pulley affixed to the first coupling portion of the ball nut by the fastening member; and
a deformation preventing member affixed to an end of the nut pulley and configured to maintain a shape of the portion of the nut pulley,
wherein the second coupling portion of the nut pulley is formed at another end of the nut pulley.

\* \* \* \* \*